Patented Oct. 6, 1931

1,825,654

UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

TERTIARY AMINE ANTIOXIDANTS

No Drawing.   Application filed August 28, 1928. Serial No. 302,641.

This invention relates to compounds for retarding or preventing the oxidation of organic substances; and compositions containing the same. Such antioxidants have many uses in various industrial and commercial fields, such as for the preservation of oxidizable organic compounds and, more particularly, for arresting deterioration of rubber compositions.

I have discovered that a series of compounds falling within the class of tertiary amines have antioxidant properties which make them useful for the above purposes. These compounds probably have the following general formula:

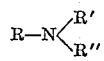

in which R represents an aryl group, R' represents an alkyl or aryl group, and R'' represents an alkyl group. In accordance with the invention certain substituted aryl-alkyl groups may be considered as either alkyl or aryl groups, e. g. the benzyl radical

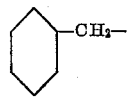

may be looked upon as either alkyl or aryl.

More specifically among the compounds falling within this class are methyl diphenylamine, methyl benzylaniline, tribenzylamine, etc. It has been found that each of these substances may be used successfully to retard or entirely prevent deterioration of organic compounds such as rubber, due to oxidation.

The antioxidants described may be prepared according to any of the well known chemical processes. For instance, methyl diphenylamine may be prepared by treating diphenylamine with methyl sulphate. Or methyl benzyl aniline may be produced by reacting methyl aniline with benzyl chloride. The invention is not limited to any specific method of preparing any of the antioxidant compounds.

To illustrate the effectiveness of these antioxidants, a series of tests were carried out in which standard vulcanizable rubber mixtures were made up, each mixture containing about 1% of one of the antioxidants. The mixture was then vulcanized at 281° F. for thirty minutes and the vulcanized rubber was cut up into test dumb-bells. Break tests were carried out on one or more of the test pieces containing the various antioxidants. Duplicates of the test pieces were placed in an oxygen bomb which was maintained at 70° C. for three days under an oxygen pressure of three hundred pounds. After this treatment these dumb-bells were also submitted to the break test. The treatment in the oxygen bomb was used to permit a rapid determination of the effect of oxygen upon the rubber, the results obtained corresponding approximately to what might be expected to take place in a much longer period of time in ordinary use of the rubber composition.

A rubber composition exactly similar to those described, made up and vulcanized under the same conditions, but containing no antioxidant, was found to deteriorate completely after the described accelerated oxidation test. The following table illustrates the effectiveness of the presence of a small amount of antioxidant in the rubber compositions:

|  | Tension at break Lbs./Sq. In. | |
| --- | --- | --- |
|  | Before aging | After aging |
| Rubber compound without antioxidant | 2600 | Deterioration |
| Rubber compound with 1% dimethylaniline | 2700 | 1425 |
| Rubber compound with 1% diethylaniline | 2290 | 1305 |
| Rubber compound with 1% methyl diphenylamine | 2220 | 1400 |
| Rubber compound with 1% methyl benzylaniline | 2720 | 1420 |
| Rubber compound with 1% tribenzylamine | 2610 | 1545 |

It is obvious that many other substances falling within the general classification described may be used as antioxidants with more or less similar effects as those set forth. Any suitable and desired changes may be made in proportions, compounds used, conditions of operation or other details without departing from the spirit and scope of the invention except as set forth in the appended claims.

I claim:

1. A rubber composition containing tribenzylamine.

2. The process of retarding oxidation of an oxidizable organic compound which comprises mixing therewith tribenzylamine.

3. The process of retarding oxidation of a rubber composition which comprises mixing therewith tribenzylamine.

In testimony whereof, I have hereunto subscribed my name this 22 day of August, 1928.

LUDWIG J. CHRISTMANN.